US006213072B1

(12) United States Patent
Sayama et al.

(10) Patent No.: US 6,213,072 B1
(45) Date of Patent: Apr. 10, 2001

(54) V-SHAPED INTERNAL COMBUSTION ENGINE

(75) Inventors: Takehiko Sayama; Nobuharu Takahashi, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/448,495

(22) Filed: Nov. 24, 1999

(30) Foreign Application Priority Data

| | | |
|---|---|---|
| Nov. 27, 1998 | (JP) | 10-337609 |
| Dec. 28, 1998 | (JP) | 10-372282 |
| Dec. 28, 1998 | (JP) | 10-372323 |

(51) Int. Cl.[7] .............................. F01L 1/02; F02B 75/22; F16F 15/26; F16H 7/18

(52) U.S. Cl. .................. 123/90.31; 123/54.4; 123/192.2

(58) Field of Search ............................ 123/90.31, 192.1, 123/192.2, 54.4, 54.6, 54.7, 54.8

(56) References Cited

U.S. PATENT DOCUMENTS

| | | | | |
|---|---|---|---|---|
| 4,683,849 | * | 8/1987 | Brown | 123/192.2 |
| 5,657,728 | * | 8/1997 | Diggs | 123/192.2 |
| 6,109,227 | * | 8/2000 | Mott | 123/90.31 |

FOREIGN PATENT DOCUMENTS

| | | |
|---|---|---|
| 62-233423 | 10/1987 | (JP) . |
| 8-193648 | 7/1996 | (JP) . |

* cited by examiner

*Primary Examiner*—Weilun Lo
(74) *Attorney, Agent, or Firm*—Armstrong, Westerman, Hattori, McLeland & Naughton, LLP

(57) ABSTRACT

First and second gears are interposed, respectively, between first and second endless power transmission belts each for driving a camshaft of a cylinder head of each of V-shaped cylinder banks and a crankshaft 7. A pair of balancer shafts are provided at symmetrical positions with respect to a separating plane acting as a center therebetween where an upper block and a lower block of a cylinder block are separated from each other from a horizontal plane passing through a center of the crankshaft in such a manner that axes of the pair of balancer shafts become parallel with the crank shaft. The crankshaft and the balancer shaft on the lower block side are connected to each other by means of a third endless power transmission belt. The balancer shafts are connected to each other by means of third gears, so that the pair of balancer shafts are driven to rotate in the opposite directions. Accordingly, the first and second endless power transmission belts and the third endless power transmission belt are prevented from overlapping each other in an axial direction of the crankshaft. In particular, the respective endless power transmission belts and the respective gears are disposed, respectively, on planes each intersecting at right angles with the axis of the crankshaft, whereby the expansion of the engine in the axial direction of the crank-shaft can be prevented.

18 Claims, 4 Drawing Sheets

V-SHAPED INTERNAL COMBUSTION ENGINE

BACKGROUND OF THE INVENTION

The present invention relates to a V-shaped internal combustion engine, particularly, a V-shaped internal combustion engine having a balancer device for canceling a secondary vibromotive force thereof.

Conventionally, there have been proposed many engines each comprising a sub-chain for driving a balancer device, an oil pump, a water pump and the like in addition to a timing chain for connecting a valve cam on a cylinder head and a crankshaft so as to drive said valve cam (for instance, Japanese Unexamined Patent Publication No. Sho. 62-233423).

For instance, if a plane crank is adopted in a four-cycle V-shaped eight cylinder engine having a bank defining angle of 90 degrees (which is formed between the V-shaped banks of cylinders) in which plane crank axial centers of all crank pins are located on the same plane, operating cycles of two cylinder banks shift 180 degrees, and explosions take place in the respective cylinder banks in an alternate fashion. According to this construction, since explosions on one of the banks are timed at a regular interval, causing no exhaust interference, the plane crank configuration is advantageous in achieving a high output. On the other hand, in the V-shaped eight cylinder engine adopting the plane crank, secondary imbalance is generated by virtue of an inertia force generated in turn by the reciprocating mass of the engine. The direction of the inertia force so generated while the secondary imbalance is being generated becomes similar to that of an inertia force generated in a state in which cylinders of a conventional in-line four cylinder engine are made horizontal when the engine is viewed as a whole. The aforesaid imbalance can, therefore, be compensated for by adopting the theory of the secondary balancer for a conventional in-line four cylinder engine, and rotating in opposite directions to each other two balancer shafts disposed at symmetrical positions with respect to a horizontal plane acting as a center therebetween which bisects the bank defining angle and passes through the center of a crankshaft (refer to Japanese Unexamined Patent Publication No. Hei. 8-193648).

When trying to provide the aforesaid balancer in the V-shaped eighth cylinder engine adopting the plane crank, it is practical to provide the same at a lower portion of one of the cylinder heads so as to be driven by the sub-chain, as shown in the above Japanese Unexamined Patent Publication No. Hei.8-193648.

On the other hand, since with a V-shaped engine having a bank defining angle of 90 degrees two cylinder heads are spaced away form each other relatively wide, it is the normal practice that separate endless power transmission timing belts are provided between the crankshaft and the respective cylinder heads individually therefor. In this case, it is natural that the balancer is disposed such that it does not interfere with an endless power transmission timing belt. In addition, however, in a case where the balancer is driven by means of a chain, the driver chain also has to be disposed such that it does not interfere with the endless power transmission timing belt.

This requires the triple provision of pulleys or sprockets on the crankshaft and due to this the engine tends to be expanded in the axial direction of the crankshaft. This is a first problem in the conventional technique.

However, it is the normal practice that a guide for the valve cam driving timing chain and a guide for the sub-chain are provided separately. In this case, the chains are spaced away from each other so that they do not interfere with each other, and the chain guides have to be enlarged unnecessarily in order to secure support portions for the chain guides, these eventually leading to a problem of the engine being made larger in size and heavier in weight. This is a second problem in the conventional technique.

SUMMARY OF THE INVENTION

The present invention was made with a view to solving the problem inherent in the conventional technique.

It is an object of the present invention to provide a V-shaped internal combustion engine with a balancer device that can be miniaturized so as to be equipped on mass-production vehicles.

The above-mentioned object can be achieved by a V-shaped internal combustion engine having a balance device, the engine according to the present invention, comprising:

a crankshaft;

V-shaped cylinder banks having a bank defining angle of 90 degree;

a first endless power transmission belt for driving a first camshaft member which is provided above a cylinder head of one of the V-shaped cylinder banks;

a first gear interposed between the first endless power transmission belt and the crankshaft;

a second endless power transmission belt for driving a second camshaft member which is provided above a cylinder head of the other of the V-shaped cylinder banks;

a second gear interposed between the second endless power transmission belt and the crankshaft, a pair of balancer shafts rotating in opposite directions to each other and extending in parallel with an axis of the crankshaft;

a pair of third gears driving the pair of balance shafts respectively; and a third power transmission belt for connecting the crankshaft and one of the balancer shafts, the third power transmission belt being disposed at a position outside an area interfering with the first and second endless power transmission belts on a plane perpendicular to the axial direction of the crankshaft.

In the above-mentioned construction, it is preferable that the crankshaft comprises a plane crank in which axial centers of all crank pins for relative cylinders are located in a common plane, the V-shape cylinder banks comprise a cylinder block in which an upper block and a lower block thereof are separated from each other with a substantially horizontal plane passing through a center of the crankshaft, one of the pair of balancer shafts which is located in the lower block side is connected to the crankshaft through the third endless power transmission belts, and the other of the pair of balancer shafts which is located in the upper block side is connected to the one of the pair of balancer shafts by intermeshing the pair of third gears with each other in such a manner that the pair of balancer shafts rotate in opposite directions to each other.

The object above can also be attained by an V-shaped internal combustion engine, according to a first aspect of the present invention, having a balancer device with a plane crank in which centers of all crank pins are located on the same plane and having a bank defining angle of 90 degrees, wherein first and second gears 12 are interposed, respectively, between first and second endless power transmission belts (chains 15) each for driving a camshaft of a cylinder head of each of V-shaped cylinder banks and a crankshaft 7, wherein a pair of balancer shafts 16*a*, 16*b* are provided at symmetrical positions with respect to a separating plane acting as a center therebetween where an upper block 1 and a lower block 2 of a cylinder block are separated from each other from a horizontal plane passing through a center of the crankshaft 7 in such a manner that axes of the pair of balancer shafts 16*a*, 16*b* become parallel with the crank shaft 7 so that the balancer shafts 16*a*, 16*b* rotate in opposite directions to each other, and wherein the crankshaft 7 and the balancer shaft 16*b* on the lower block 2 side are connected to each other by means of a third endless power transmission belt (a chain 19), and the balancer shaft 16*b* on the lower block 2 side and the balancer shaft 16*a* on the upper block side are connected to each other by means of third gears 20*a*, 20*b*, whereby the pair of balancer shafts 16*a*, 16*b* are driven to rotate in the opposite directions. According to this construction, the first and second endless power transmission belts for driving the camshafts and the third endless power transmission belt for driving the balancer shaft are prevented from overlapping each other in an axial direction of the crankshaft, whereby the expansion of the engine in the axial direction of the crankshaft can be prevented. In particular, the expansion of the engine in the axial direction of the crankshaft can further be prevented by disposing the first to third power transmission belts on a plane intersecting at right angles with the axis of the crankshaft, and providing the first to third gears on another plane intersecting at right angles with the axis of said crankshaft. Moreover, a relative phase angle error between the crankshaft 7 and both of the balancer shafts 16 can be minimized and a dead space formed therebetween can be utilized effectively by disposing the balancer shaft 16*a* on the upper block 1 side on a tensioned side of the third power transmission belt, and providing a guide member 28 for the third power transmission belt (the chain 19) and a support portion 28*a* therefor between the balancer shaft 16*a* on the upper block 1 side and the tensioned side of the third power transmission belt.

Further, in the above-mentioned construction of the present invention, it is preferable that a balancer shaft driving sub-chain 19 for connecting one of balancer shafts 16 provided, for instance, in a four-cycle V-shaped eight cylinder engine adopting a plane crank and having a bank defining angle of 90 degrees and a crankshaft 7 so as to drive the one of the balancer shafts 16 and a cam driving timing chain 15 for driving a cam for opening and closing an intake valve or an exhaust valve are made to confront each other on tensioned sides thereof, and a guide member 28 and a guide member 25 for the respective chains are made integral with each other.

In addition, the balancer shaft driving sub-chain 19 and the cam driving timing chain 15 for driving a cam for opening and closing an intake valve or an exhaust valve are disposed on the same plane intersecting at right angles with an axis of the crankshaft 7 so that a guide member 28 and a guide member 25 for the respective chains are made integral with each other, whereby the number of guide members for the chains can be reduced and a support portion for the guide members can be shared. This serves to prevent the enlargement of the guide members in an axial direction of the crankshaft. Moreover, since there is no torsional load applied to the guide members from the chains, in other words, since loads applied from the chains are directed to be generated only in the same plane, the durability of the guide members can be improved. Furthermore, the integrated guide members 25, 28 are provided on an axis of the balancer shaft 16*a* supported on a cylinder block above the balancer shaft driving sub-chain 19 at an end of the balancer shaft 16*a*, whereby the guide members 25, 28 can be provided by effectively utilizing a space on the axis of the balancer shaft, and oil can be supplied to the sub-chain 19 from the balancer shaft 16*a* side via these guide members 25, 28. The sub-chain may be sued for not only driving a balancer device but also driving an oil pump, a water pump or the like.

According to the above-mentioned preferable construction, it is possible to provide a V-shaped internal combustion engine with a sub-chain that can be made smaller in size and lighter in weight.

Further, in the above-mentioned construction according to the present invention, it is also advantageous to provide a cam driving structure in which a pair of driven pinions 12*a*, 12*b*provided for each cylinder bank are simultaneously brought into mesh engagement with a driver pinion 11 coupled to a crankshaft 7 so as to transmit a rotational force of the crankshaft to a camshaft for opening and closing an intake valve or an exhaust valve, wherein the pair of driven pinions are provided such that the pair of driven pinions are brought into mesh engagement with the driver pinion in a state in which mesh engagements of the pair of driven pinions with the driver pinion shift half a pitch from each other.

According to this construction, since the phases of mesh engagements of the driven pinions with the driver pinion in both of the cylinder blocks shifts half a pitch from each other, and hence the waveforms of interlocking noise generated shift accordingly, the noise level when interlocking noise from the respective cylinder banks in synthesized can be suppressed to a low level.

Furthermore, in the above-mentioned construction according to the present invention, it is also advantageous to provide a cam driving structure in which a pair of driven pinions 12*a*, 12*b* provided for each cylinder bank are simultaneously brought into mesh engagement with a driver pinion 11 coupled to a crankshaft 7 so as to transmit a rotational force of the crankshaft to a camshaft 5 for opening and closing an intake valve or an exhaust valve, wherein a wound-around power transmission means interposed between the driven pinions and the camshaft comprises a chain 15 and sprockets 13, 14 or a toothed belt and toothed pulleys, the sprockets 13*a*, 13*b* or toothed pulleys integrally provided on each of said pair of driven pinions being provided such that the sprockets 13*a*, 13*b* or toothed pulleys are brought into mesh engagement with said chain 15 or toothed belt in a state in which mesh engagements of the sprockets or toothed pulleys with the chain or toothed belt shift half a pitch from each other.

According to this construction, since the phases of mesh engagements of the sprocket or toothed pulley with the chain or toothed belt in both of the cylinder banks shift half a cycle and the waveforms of interlocking noise generated also shift accordingly, the noise level when interlocking noise from the respective cylinder banks is synthesized can be suppressed to a low level. In addition, although it is effective at the start of mesh engagement when interlocking noise is loud that the sprocket or toothed pulley is brought into mesh engagement with the chain or toothed belt in a state in which a mesh engagement in one of the cylinder bank shift half a pitch from a mesh engagement in the other bank, if such s half-a-pitch shifting mesh engagement is arranged toward the end of a mesh engagement, the noise level can further be reduced.

Furthermore, the present invention provides a cam driving structure for a four-cycle V-shaped engine in which a pair of driven pinions 12*a*, 12*b* provided for each cylinder bank are simultaneously brought into mesh engagement with a driver pinion 11 coupled to a crank shaft 7 so as to transmit a rotational force of the crankshaft to a camshaft 5 for opening and closing an intake valve or an exhaust valve, wherein the pair of driven pinions are provided such that the pair of driven pinions are brought into mesh engagement with the driver pinion in a state in which mesh engagements of the pair of driven pinions with the driver pinion shift half a pitch from each other, wherein a wound-around power transmission means interposed between the driven pinions and the camshaft comprises a chain 15 and sprockets 13, 14 or a toothed belt and toothed pulleys, the sprockets or toothed pulleys integrally provided on each of the pair of driven pinions being provided such that the sprockets or toothed pulleys are brought into mesh engagement with the chain or toothed belt in a state in which mesh engagements of the sprockets or toothed pulleys with the chain or toothed belt shift half a pitch from each other, and wherein an assembling angle mark 47 for regulating an assembling angle for each cylinder bank is provided on a gear assembly 46 in which the sprockets or toothed pulleys are integrally provided on said driven pinions.

According to this construction, since the phases of mesh engagements in both of the cylinder blocks shifts half a pitch from each other, and hence the waveforms of interlocking noise generated shift accordingly, the noise level when interlocking noise from the respective cylinder banks is synthesized can be suppressed to a low level, and an erroneous assembly can be avoided to thereby realize securely a predetermined mesh engagement conditions. In other word, although the mesh engagement of the driven pinions to the driver pinion described above can be realized by assembling the respective gears to pivot shafts disposed so as to satisfy predetermined conditions, the positional relationship of the sprocket or toothed pulley is affected by the assembling angle at which the integrally provided driven pinions are assembled, and if they are erroneously assembled, the aforesaid predetermined mesh engagement state cannot be realized. To cope with this, as described above, an erroneous assembly can be avoided by affixing the assembly angle mark on the gear assembly for the respective cylinder banks. In addition to this, the gear assembly can be shared between the respective cylinder banks, this resulting in an advantage in which the increase in the number of types of components can also be maintained low.

According to this construction, it is possible to provide a cam driving structure constructed so as to eliminate a risk of high level noise being generated, respectively, from a speed reduction mechanism independently provided in a pair of cylinder banks of a four-cycle V-shaped engine.

DETAILED DESCRIPTION OF THE PREFERRED EMBODIMENT

Hereinafter, a preferable embodiment according to the present invention will be explained in the accompanying drawings.

Figure 1:
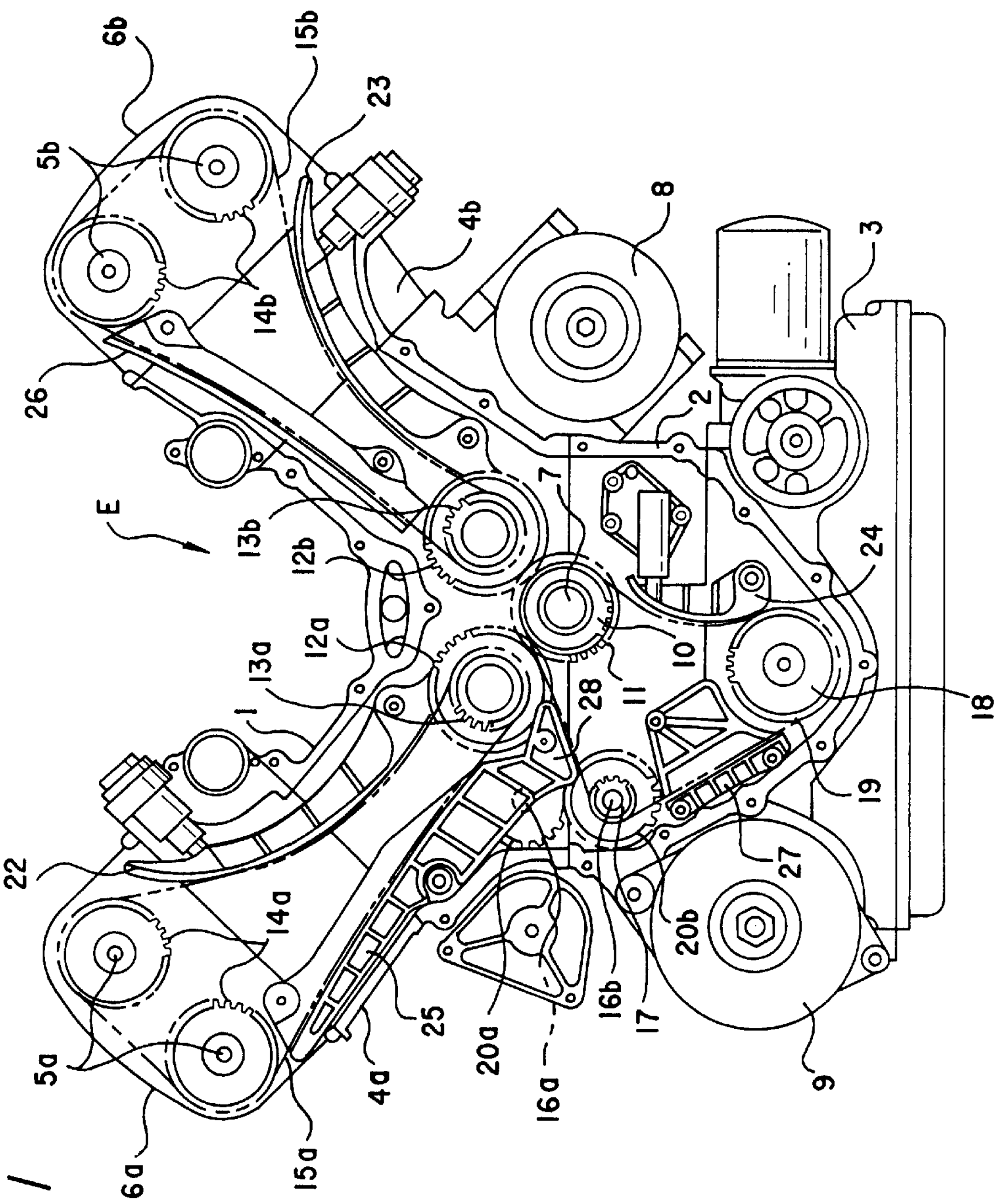
FIG. 1 is a plan view of a crank pulley side of a V-shaped internal combustion engine according to the present invention.
Figure 2:
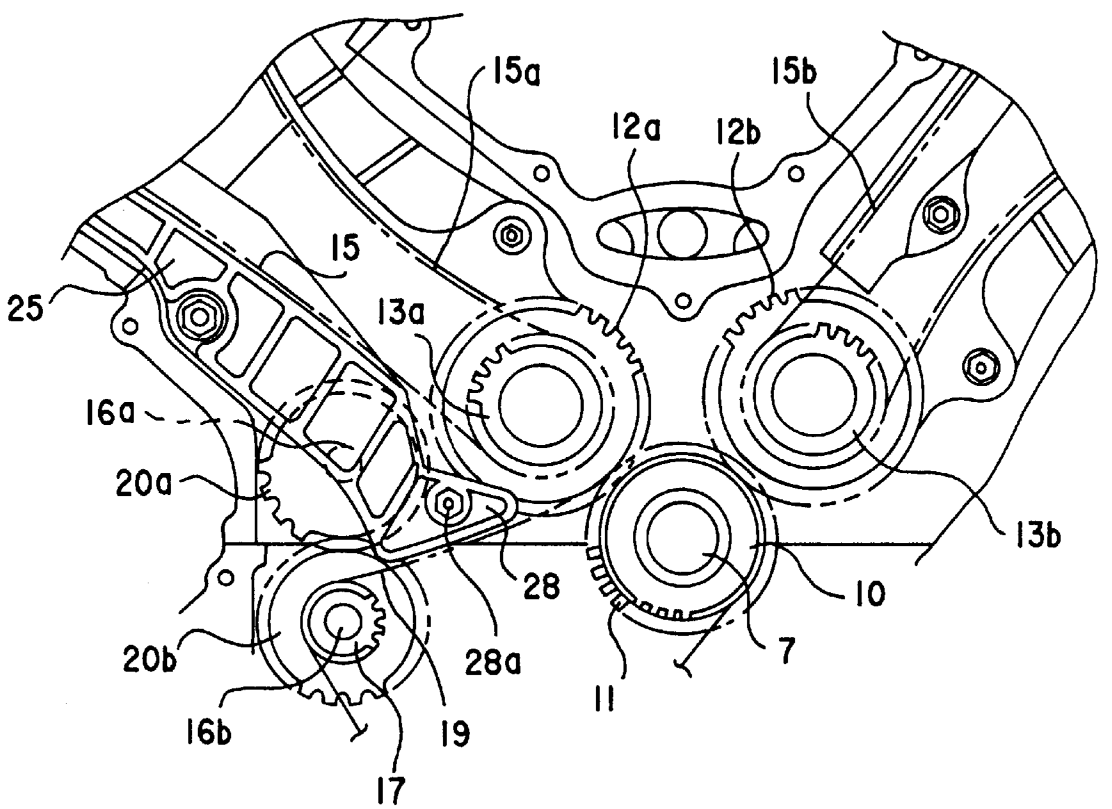
FIG. 2 is an enlarged view of a main part of FIG. 1.

FIG. 1 is an elevation of a crank pulley side of a four-cycle V-shaped eight cylinder engine to which the present invention is applied.

This engine E comprises an upper block 1 provided with a pair of cylinder banks whose included angle is 90 degrees, a lower block 2 joined to a lower surface of the upper block 1, an oil pan 3 joined to a lower surface of the lower block 2 and cylinder heads 4*a*, 4*b* joined, respectively, to upper surfaces of both the cylinder banks of the upper block 1. In addition, two camshafts 5*a*, 5*b* are provided above the respective cylinder heads 4*a*, 4*b*, and these camshafts 5*a*, 5*b* are covered, respectively, with head covers 6*a*, 6*b* joined to upper surfaces of the cylinder heads 4*a*, 4*b*.

A crankshaft 7 is supported on a joining surface between the upper block 1 and the lower block 2 by a main bearing, as with a known engine.

A compressor 8 for an air conditioner is mounted on the upper block 1 to the right of the crankshaft 7, and an alternator 9 is mounted on the lower block 2 to the left of the crankshaft 7. These compressor 8 and the alternator 9 are interlockingly connected to the crankshaft 7 via a belt/pulley mechanism not shown in the drawing.

A crank sprocket 10 is securely fitted over the crankshaft 7 at a position axially inwardly of the crank pulley, and a driver pinion 11 is securely fitted on the crankshaft 7 at a position axially inwardly of the crank sprocket 10.

Two speed reducing driven pinions 12*a*, 12*b* are simultaneously brought into mesh engagement with the driver pinion 11, which speed reducing driven pinions act, respectively, as first and second gears which are provided at transversely symmetrical positions with respect to a plane bisecting the bank defining angle and passing through the center of the crankshaft. Small sprockets 13*a*, 13*b* are integrally provided on those driven pinions 12*a*, 12*b*, and silent chains 15*a*, 15*b* acting as first and second endless power transmission belts are extended, respectively, between these small sprockets 13*a*, 13*b* and cam sprockets 14*a*, 14*b* each provided on two camshafts 5*a*, 5*b* of each of the cylinder banks in such a manner as to be wound thereabound for driving the camshafts. This permits the transmission of a rotational force generated by the crankshaft 7 to the two camshafts 5*a*, 5*b* of both of the cylinder banks.

The upper block 1 and lower block 2 are separated from each other from a horizontal plane passing through the center of the crankshaft 7, and two balancer shafts 16*a*, 16*b* whose axes extend in parallel with the crankshaft 7 are pivotally supported at vertically symmetrical positions with respect to the separating plane.

A balancer shaft sprocket 17 is securely fitted over the balancer shaft 16*b* of those two balancer shafts 16*a*, 16*b* which is supported on the lower block side at one end thereof. A silent chain 19 acting as a third endless power transmission belt is extended between the balancer shaft sprocket 17, the crank sprocket 10 and a pump sprocket 18 fixed to an oil pump (not shown) mounted on a lower surface of the lower block 2 in such a manner as to be wound thereabound for driving the balancer shafts, whereby the lower balancer shaft 16*b* and the oil pump are constructed so as rotate interlockingly with the crankshaft 7.

The two balancer shafts are adapted to rotate in opposite directions to each other as the same rotational speed through the mesh engagement of gears 20*a*, 20*b* acting as a third gear that are securely fitted over the balancer shafts axially inwardly of the above balancer shaft sprocket 17 and which each have the same number of gear teeth.

The balancer shafts 16 are provided on a tensioned side of the silent chain 19 relative to the rotational direction of the crankshaft 7. This can minimize a relative phase angle error between the crankshaft 7 and the balancer shafts 16.

Here, since the respective camshaft driving silent chains 15*a*, 15*b* are constructed, as described above, so as to be driven by the crankshaft 7 (the driver pinion 11) via the speed reducing driving pinions 12*a*, 12*b*, they are slightly spaced away from the crankshaft 7, and since the silent chain 19 is wound around the balancer shaft 16*b* (the balancer shaft sprocket 17) supported on the lower block side, there is no risk of the silent chain 15*a* acting as the first endless power transmission belt interfering with the silent chain 19 acting as the third endless power transmission belt. Consequently, the expansion of the engine E particularly in the axial direction of the crankshaft 7 can be prevented. In this construction, the silent chains 15*a*, 15*b* and the silent chain 19 are disposed on a plane intersecting at right angles with the axis of the crankshaft 7, and the driven pinions 12*a*, 12*b* and the gears 20*a*, 20*b* are disposed on a plane intersecting at right angles with the axis of the crank shaft 7, whereby the expansion of the engine E in the axial direction of the crankshaft 7 can further be prevented.

Chain tensioners 22 to 24 in which a pressing force is automatically adjusted by a hydraulic plunger and run-out prevention chain guides 25 to 28 are attached individually to the silent chains 15*a*, 15*b* wound around the cam sprockets 14*a*, 14*b* of the respective camshafts 5 of both of the cylinder banks and the silent chain 19 wound around the balancer shaft sprocket 17 and the pump sprocket 18. These chain tensioners 22 to 24 and the chain guides 25 to 28 are each fixed with a bolt or the like to a suitable position on an end face of the upper block 1, lower block 2, oil pan 3 and cylinder heads 4*a*, 4*b* on the crank pulley side thereof.

Here, the chain guide 28 and a support portion 28*a* therefor on the tensioned side of the silent chain 19 are provided between the tensioned side of the silent chain 19 and the balancer shaft 16*a* on the upper block side. This facilitates the effective utilization of a dead space formed between the tensioned side of the silent chain 19 and the balancer shaft 16*a* on the upper block side and therefore obviates the necessity of enlarging the chain guide 28 unnecessarily.

In addition, this chain guide 28 is made integral with the chain guide 25 for the silent chain 15*a* disposed on the side where the balancer shafts 16 are provided. This permits at least two necessary support portions to be shared, thereby making it possible to reduce the number of components and man hours for assembly of components involved. Furthermore, these integrated chain guides 25, 28 are constructed so as to cover the balancer shaft 16*a* on the upper block side from where they are located, but since their positions in the axial direction of the crankshaft substantially coincide with the end of the balancer shaft 16*a*, those chain guides can be disposed by effectively utilizing a space outwardly of the end of the balancer shaft 16*a* and these chain guides can also be utilized as a thrust bearing for the balancer shaft 16*a*. In this case, the necessity of additional thrust bearing components such as a thrust plate can be obviated and this also serves to reduce the number of components and the size of the engine further.

Figure 3:
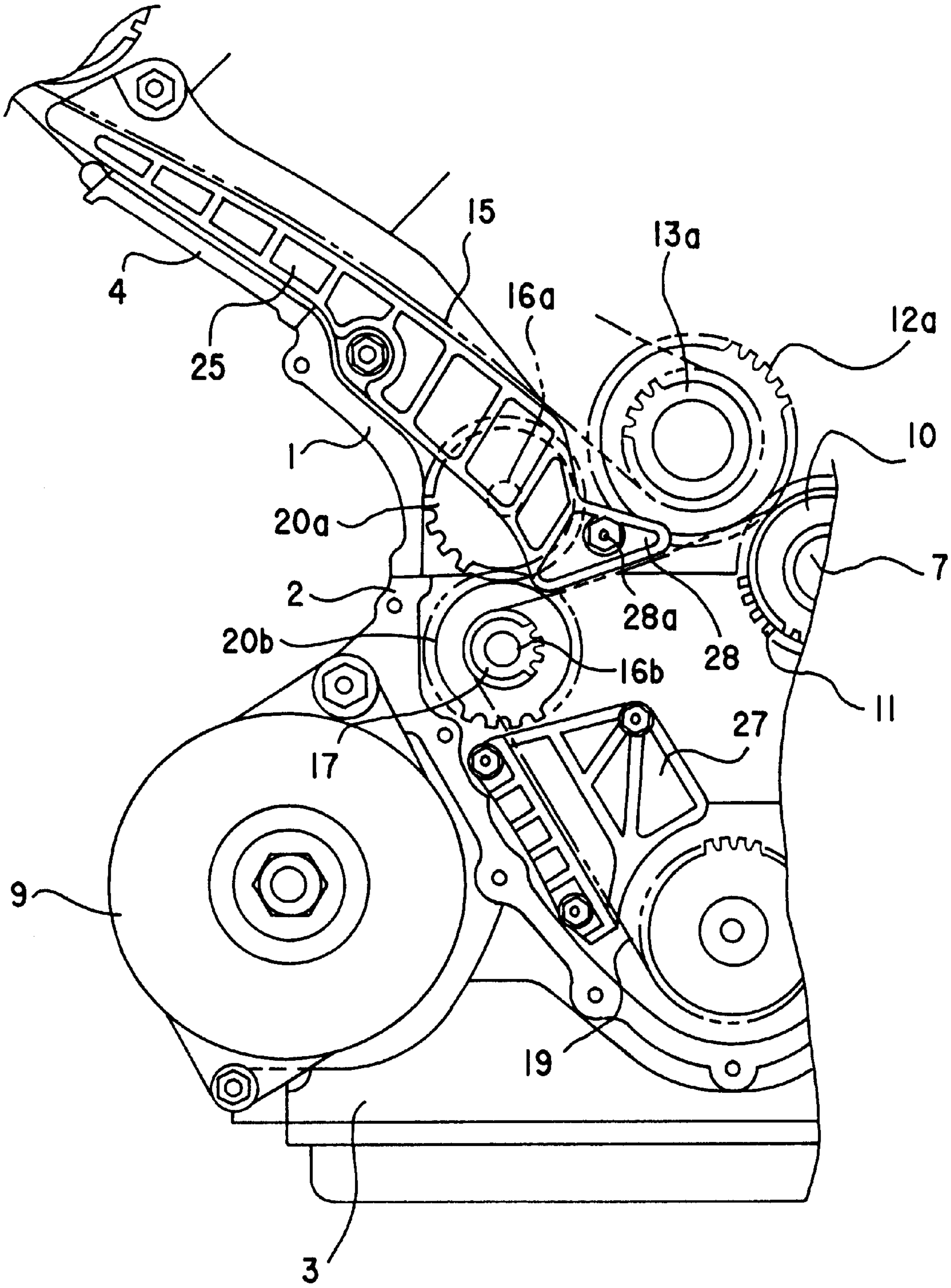
FIG. 3 is an enlarged view of other main part of FIG. 1.

As shown in FIG. 3 showing the other main part, the tensioned side of one of the timing chains 15 and the tensioned side of the silent chain 19 are disposed close to each other so that they confront each other. Due to this, the integrated chain guides 25, 28 are made smaller. When it is used in here, the word "confront" means that the included angle between the tensioned side of the timing chain 15 and the tensioned side of the silent chain 19 is smaller than 90 degrees.

Furthermore, these integrated chain guides 25, 28 are constructed so as to cover the balancer shaft 16*a* on the upper block side from where they are located, but since their positions in the axial direction of the crankshaft substantially coincide with the end of the balancer shaft 16*a*, those chain guides can be utilized as a thrust bearing for the balancer shaft 16*a*. In this case, a thrust plate can be omitted, and oil flowing out from the balancer shaft 16*a* can be supplied to the silent chain 19 via the integrated chain guides 25, 28.

On the other hand, the chain guide 27 is configured to cover an upper surface of the pump sprocket 18. This prevents oil from being stirred unnecessarily by the pump sprocket 18 and the silent chain 19 and diffused thereby.

Thus, according to this embodiment, the balancer shaft driving sub-chain for driving one of the balancer shafts provided, for instance, in a four-cycle V-shaped eight cylinder engine adopting a plane crank and having a bank defining angle of 90 degrees and the cam driving timing chain for driving a cam for opening and closing an intake valve or an exhaust valve are made to confront each other on the tensioned sides thereof, and their guide members are made integral with each other. This can reduce the number of guide members required for the chains to thereby reduce the number of components, whereby the engine can be miniaturized. Also, the support portion for the guide members can be shared, and man hours required for assembly of components can be reduced. In addition, since the tensioned sides of the respective chains are made to confront each other, the guide members can also be miniatured. Moreover, the balancer shaft driving sub-chain and the above cam driving timing chains are disposed on the same plane intersecting at right angles with the axis of the crankshaft so that the guide members for the respective chains are made integral with each another, whereby the number of guide members for the chains can also be reduced as is described above, and not only can the support portion for the guide members be shared but also the enlargement of the guide members in an axial direction of the crankshaft can be prevented. Moreover, since there is no torsional load applied to the guide members from the chains, in other words, since loads applied from the chains are directed to be generated only in the same plane, the durability of the guide members can be improved. Furthermore, the integrated guide members are provided on the axis of the balancer shaft supported on the cylinder block above the balancer shaft driving sub-chain 19 at the end of the balancer shaft, whereby the guide members can be provided by effectively utilizing the space on the axis of the balancer shaft, and oil can be supplied to the sub-chain from the balancer shaft side via these guide members, this simplifying the construction thereof.

Figure 4:
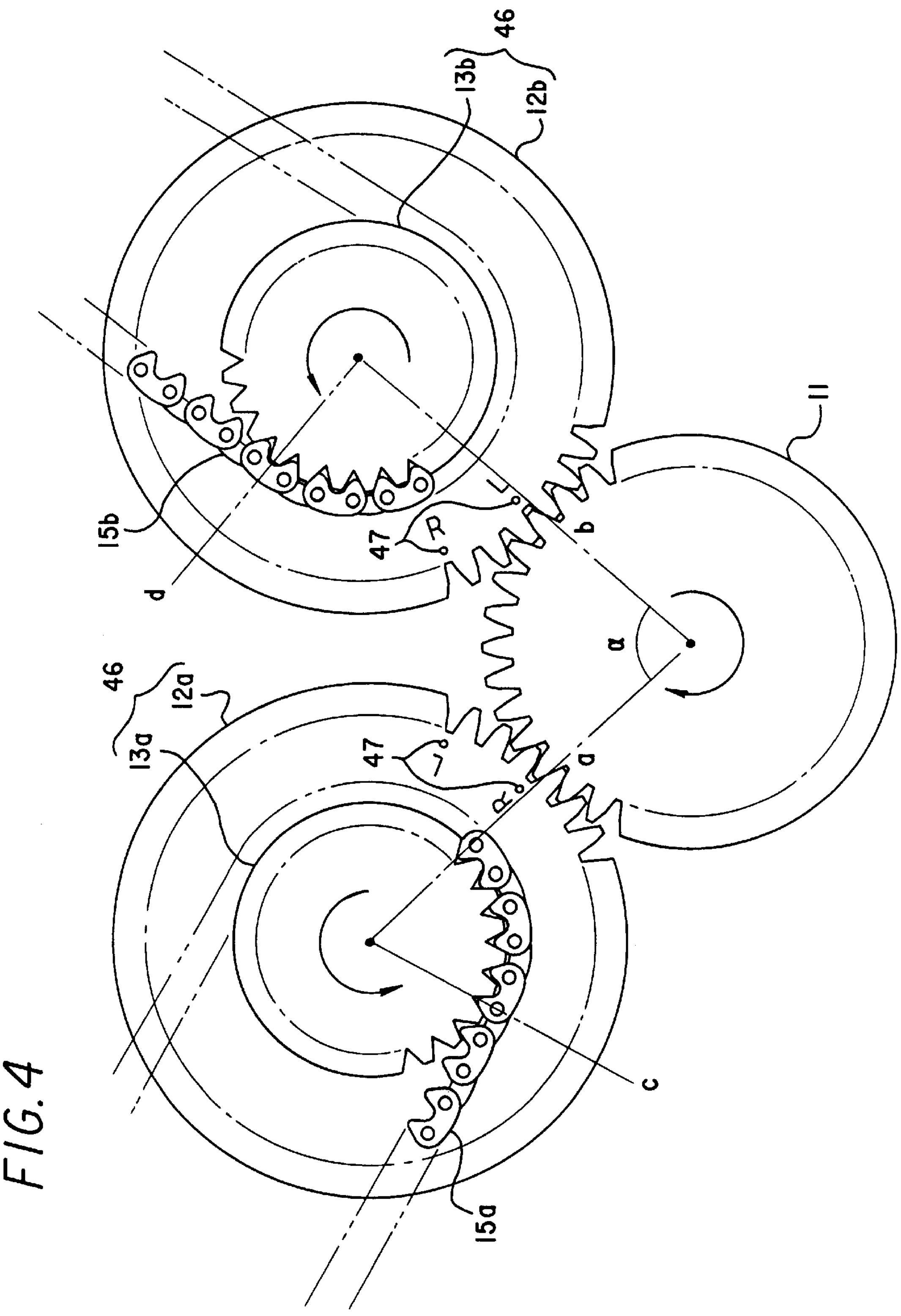
FIG. 4 is an enlarged view of another main part of FIG. 1.

As shown in detail in FIG. 4, the left and right driven pinions 12*a*, 12*b* are in mesh engagement with the driver pinion 11 in such a manner that the mesh engagement of the driven pinions with the driver pinion shifts half a pitch in the respective cylinder banks. This half-a-pitch shifting mesh engagement of the left and right driven pinions 12*a*, 12*b* with the driver pinion 11 becomes clear when comparing mesh engagement portions of those driven pinions and driver pinion along straight lines a, b connecting centers of the respective gears.

This mesh engagement state can be realized by setting the relative mounting angle α (degree) of the driven pinions 12*a*, 12*b* to the driver pinion 11 as follows.

$\alpha=(n+\frac{1}{2})\beta$ where, n is any integer. β is a center angle equal to a pitch of the teeth of the driver pinion 11, and assuming that the number of teeth of the driver pinion 11 is Z1, the center angle is obtained from the following expression;

$\beta=360/Z1$

In FIG. 4, the number of teeth Z1 of the driver pinion 11 is 36 and the center angle β is 10 degrees, and the mounting angle α is 85 degrees (n=8).

The gear assembly 46 in which the driven pinions 12*a*, 12*b* and the small sprockets 13*a*, 13*b* are integrally provided is common over left and right in use, and an assembling angle mark 47 is engraved in an end face of the gear assembly. A letter R of L is affixed to this assembling angle mark 47, and the gear assembly 46 positioned right-hand side as viewed from the driver's seat (an left-hand side assembly in FIG. 4) is given an assembling angle mark 47 with an R affixed thereto and is assembled such that the assembling angle mark 47 is located at a point where the driven pinion 12 is brought into mesh engagement with the driver pinion, while the gear assembly 46 positioned left-hand side as viewed from the driver's seat (a right-hand side assembly in FIG. 4) is given an assembling angle mark 47 with an L affixed thereto and is assembled such that the assembling angle mark 47 is located at a point where the driven pinion 12 is brought into mesh engagement with the driver pinion.

Thus, with the above-described construction in which the left and right driven pinions 12*a*, 12*b* are brought into mesh engagement with the driver pinion in a state such mesh engagements shift half a pitch in the respective cylinder banks, the phases of the driven pinions 12*a*, 12*b*and small sprockets 13*a*, 13*b* are set so as to realize a mesh engagement state in which the left and right small sprockets 13*a*, 13*b*shift half a pitch relative to the silent chains 15, and the assembling angle mark 47 is affixed to the gear assembly 46 in each of the cylinder banks, the gear assembly 46 can commonly be used over the respective cylinder banks, the increase in the number of components can be suppressed, and the noise level can suppressed to a remarkably low level. This half-a-pitch shifting mesh engagement state becomes clear when comparing the mesh engagement portions on radial straight lines c, d intersecting, respectively, with the center lines on the pulling side of the silent chains 15 shown in FIG. 4. In addition, in FIG. 4, the number of teeth Z2 of the driven pinion 12 is set as 45 and the number of teeth Z3 of the small sprocket 13 is set as 25, whereby there is set a relative positional relationship between the two gears in which they take the same position every 72 degrees, thereby making it possible to affix five assembling angle marks 47 to each gear assembly 46.

As has been described heretofore, according to the embodiment above, since the phases of mesh engagements of the gears shift half a pitch in both of the cylinder banks and hence the waveforms of mesh engagements shift accordingly, the noise level when interlocking noise is synthesized can be suppressed to a low level. Thus, this embodiment is advantageous in reducing noise from the engine.

In addition, in the above-described construction, the chain is used as the endless power transmission belt, but a belt may be used instead thereof. In this case, the sprockets used in the above construction may be replaced with pulleys.

Further, in the aforesaid mode of operation the sub-chain is used for driving the balancer device and the oil pump, but the application of the sub-chain is not limited thereto, and the sub-chain may be used for driving the water pump or the like.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

Thus, according to the present invention, since there is provided the balancer device for a V-shaped engine provided with a plane crank in which centers of all crank pins are located on the same plane and having a bank defining angle of 90 degrees, wherein the first and second gears 12 are interposed, respectively, between the first and second endless power transmission belts each for driving the camshafts above the cylinder head of each of the V-shaped cylinder banks and the crankshaft 7, wherein the pair of balancer shafts 16*a*, 16*b* are provided at symmetrical positions with respect to the separating plane acting as a center therebetween where the upper block 1 and the lower block 2 of the cylinder block are separated from each other from the horizontal plane passing through the center of the crankshaft 7 in such a manner that the axes of the pair of balancer shafts 16*a*, 16*b* are parallel with the crank shaft 7 so that the balancer shafts 16*a*, 16*b* rotate in opposite directions to each other, and wherein the crankshaft 7 and the balancer shaft 16*b* on the lower block 2 side are connected to each other by means of the third endless power transmission belt, and the balancer shaft 16*b* on the lower block 2 side and the balancer shaft 16*a* on the upper block side are connected to each other by means of the third gears 20*a*, 20*b*, whereby the pair of balancer shafts 16*a*, 16*b* are driven to rotate in the opposite directions. According to this construction, the first and second endless power transmission belts for driving the camshafts and the third endless power transmission belt for driving the balancer shaft are prevented from overlapping each other in an axial direction of the crankshaft, whereby the expansion of the engine in the axial direction of the crankshaft can be prevent and a complicated layout of the third endless power transmission belt can also be eliminated. In particular, the expansion of the engine in the axial direction of the crankshaft can further be prevented by disposing the first to third power transmission belts on the plane intersecting at right angles with the axis of the crankshaft, and providing the first to third gears on the plane intersecting at right angles with the axis of said crankshaft. Moreover, a relative phase angle error between the crankshaft 7 and both of the balancer shafts 16 can be minimized and a dead space formed therebetween can be utilized effectively by disposing the balancer shaft 16*a* on the upper block 1 side on the tensioned side of the third power transmission belt, and providing the guide member 28 for the third power transmission belt and the support portion 28*a* therefor between the balancer shaft 16*a* on the upper block 1 side and the tensioned side of the third power transmission belt.

What is claimed is:

1. A V-shaped internal combustion engine having a balance device, said engine comprising:

a crankshaft;

V-shaped cylinder banks having a bank defining angle of 90 degree;

a first endless power transmission belt for driving a first camshaft member which is provided above a cylinder head of one of said V-shaped cylinder banks;

a first gear interposed between said first endless power transmission belt and said crankshaft;

a second endless power transmission belt for driving a second camshaft member which is provided above a cylinder head of the other of said V-shaped cylinder banks;

a second gear interposed between said second endless power transmission belt and said crankshaft, a pair of balancer shafts rotating in opposite directions to each other and extending in parallel with an axis of said crankshaft;

a pair of third gears driving said pair of balance shafts respectively; and a third power transmission belt for connecting said crankshaft and one of said balancer shafts, said third power transmission belt being disposed at a position outside an area interfering with said first and second endless power transmission belts on a plane perpendicular to the axial direction of said crankshaft.

2. The V-shaped internal combustion engine according to claim 1, wherein said crankshaft comprises a plane crank in which axial centers of all crank pins for relative cylinders are located in a common plane, said V-shaped cylinder banks comprise a cylinder block in which an upper block and a lower block thereof are separated from each other with a substantially horizontal plane passing through a center of said crankshaft, one of said pair of balancer shafts which is located in the lower block side is connected to said crankshaft through said third endless power transmission belts, and the other of said pair of balancer shafts which is located in the upper block side is connected to said one of said pair of balancer shafts by intermeshing said pair of third gears with each other in such a manner that said pair of balancer shafts rotate in opposite directions to each other.

3. The V-shaped internal combustion engine according to claim 2, wherein said first to third power transmission belts are substantially disposed in a first plane intersecting at a right angle with an axis of said crankshaft, and said first to third gears are disposed on a second plane intersecting at a right angle with the axis of said crankshaft.

4. The V-shaped internal combustion engine according to claim 3, wherein one of said balancer shafts disposed on the upper block side is disposed on a tensioned side of said third power transmission belt, and said engine further comprises a guide member for guiding said third power transmission belt, said guide member being supported at a support portion thereof which is disposed between the upper block side balancer shaft and the tensioned side of said third power transmission belt.

5. The V-shaped internal combustion engine according to claim 4, wherein said tension side of said third power transmission belt is confronted with a tension side of said first power transmission belt, side guide member guides both said first power transmission belt and said third power transmission belt, and said guide member is disposed at said tension side of said first power transmission belt and also said tension side of said third power transmission belt.

6. The V-shaped internal combustion engine according to claim 4, wherein said tension side of said third power transmission belt and said tension side of said first power transmission belt are substantially disposed in a third plane intersecting at a right angle with the axis of said crankshaft, said guide member guides both said first power transmission belt and said third power transmission belt, and said guide member is disposed at said tension side of said first power transmission belt and also said tension side of said third power transmission belt.

7. The V-shaped internal combustion engine according to claim 2, wherein one of said balancer shafts disposed on the upper block side is disposed on a tensioned side of said third power transmission belt, and said engine further comprises a guide member for guiding said third power transmission belt, said guide member being supported at a support portion thereof which is disposed between the upper block side balancer shaft and the tensioned side of said third power transmission belt.

8. The V-shaped internal combustion engine according to claim 7, wherein said tension side of said third power transmission belt is confronted with a tension side of said first power transmission belt, said guide member guides both said first power transmission belt and said third power transmission belt, and said guide member is disposed at said tension side of said first power transmission belt and also said tension side of said third power transmission belt.

9. The V-shaped internal combustion engine according to claim 7, wherein said tension side of said third power transmission belt and said tension side of said first power transmission belt are substantially disposed in a third plane intersecting at a right angle with the axis of said crankshaft, said guide member guides both said first power transmission belt and said third power transmission belt, and said guide member is disposed at said tension side of said first power transmission belt and also said tension side of said third power transmission belt.

10. The V-shaped internal combustion engine according to claim 1, further comprising:

a guide member for guiding both said first power transmission belt and said third power transmission belt is provided, wherein said guide member is disposed at a tension side of said first power transmission belt and a tension side of said third power transmission belt which are confronted with each other.

11. The V-shaped internal combustion engine according to claim 10, wherein said guide member is provided on a position intersecting an axis of one of said pair of balancer shafts which is disposed above said third power transmission belt.

12. The V-shaped internal combustion engine according to claim 11, wherein thrust force of one of said balancer shafts is received by said guide member.

13. The V-shaped internal combustion engine according to claim 1, further comprising:

a guide member for guiding both said first power transmission belt and said third power transmission belt is provided, wherein said guide member is disposed at a tension side of said first power transmission belt and a tension sides of said third power transmission belt which are substantially disposed in a third plane intersecting at a right angle with the axis of said crankshaft.

14. The V-shaped internal combustion engine according to claim 13, wherein said guide member is provided on a position intersecting an axis of one of said pair of balancer shafts which is disposed above said third power transmission belt.

15. The V-shaped internal combustion engine according to claim 14, wherein thrust force of one of said balancer shafts is received by said guide member.

16. The V-shaped internal combustion engine according to claim 1, wherein said crankshaft is connected to a driver pinion which is brought into mesh engagement with both said first and second gears in a state that the mesh engagements of said first and second gears with said driving pinion shift half a pitch from each other.

17. The V-shaped internal combustion engine according to claim 16, wherein each of said first and second gears comprises one of a sprocket and a toothed pulley, each of said first and second power transmission belts comprises one of a chain and a toothed belt, one of said sprocket and said toothed pulley is brought into mesh engagement with one of said chain and toothed belt in a state that the mesh engagements of the one of said sprocket and toothed pulley with the one of said chain and toothed belt shift half a pitch from each other, and an assembling angle mark for regulating an assembling angle for each cylinder banks is provided on a gear assembly in which one of said sprocket and said toothed pulley is integrally provided with one of said first and second gears.

18. The V-shaped internal combustion engine according to claim 1, wherein said crankshaft is connected to a driver pinion which is brought into mesh engagement with both said first and second gears, each of said first and second gears comprises one of a sprocket and a toothed pulley, each of said first and second power transmission belts comprises one of a chain and a toothed belt, and one of said sprocket and said toothed pulley is brought into mesh engagement with one of said chain and toothed belt in a state that the mesh engagements of the one of said sprocket and toothed pulley with the one of said chain and toothed belt shift half a pitch from each other.

* * * * *